United States Patent [19]

Tibbs

[11] 4,047,326
[45] Sept. 13, 1977

[54] VASCULAR CONTACT ROTATING AND STATIONARY ABRADING ELECTRODE DEVICES FOR ELECTRIC WEED KILLING

[76] Inventor: Robert C. Tibbs, Cleveland Drive, Cleveland, Miss. 38732

[21] Appl. No.: 638,097

[22] Filed: Dec. 5, 1975

[51] Int. Cl.² .................................................. A01M 21/00
[52] U.S. Cl. ................................................................. 47/1.3
[58] Field of Search ........................... 47/1, 1.3, 1.5, 1.7

[56] References Cited

U.S. PATENT DOCUMENTS

| 546,682 | 9/1895 | Scheible | 47/1.3 |
|---|---|---|---|
| 728,312 | 5/1903 | Smith | 47/1.3 |
| 2,007,383 | 7/1935 | Opp | 47/1.3 |
| 2,551,096 | 5/1951 | Chittick | 47/1.5 X |
| 2,558,376 | 6/1951 | Opp et al. | 47/1.3 |
| 2,750,712 | 6/1956 | Rainey | 47/1.3 |
| 2,988,849 | 6/1961 | Laughlin | 47/1.5 |
| 3,919,806 | 11/1975 | Pluenneke et al. | 47/1.3 |
| B 491,624 | 3/1976 | Ablett et al. | 47/1.7 |

FOREIGN PATENT DOCUMENTS

| 223,120 | 8/1959 | Australia | 47/1.5 |

Primary Examiner—Robert E. Bagwill
Attorney, Agent, or Firm—Clarence A. O'Brien; Harvey B. Jacobson

[57] ABSTRACT

Undesirable vegetation or weeds are destroyed by electrical current conducted therethrough by prolonged contact with electrodes. Internal plant tissues of the vegetation are exposed for electrode contact by removal of electrically resistant external layer portions through abrasion of the plant stems or stalks along a path of movement of the apparatus to reduce the electrical energy requirements for plant destroying purposes.

5 Claims, 8 Drawing Figures

VASCULAR CONTACT ROTATING AND STATIONARY ABRADING ELECTRODE DEVICES FOR ELECTRIC WEED KILLING

BACKGROUND OF THE INVENTION

This invention relates to the extermination or killing of weeds or undesirable amd noxious vegetation involving the use of electrical energy.

Weed killing methods and apparatus wherein electrical current is conducted through undesirable plants for the destruction of the same, are well known as disclosed, for example, in U.S. Pat. Nos. 492,635, 593,235 and 728,312. It is also recognized in the prior art that the external tissue layers of vegetation have relatively high electrical resistance as compared to the internal tissues protectively enclosed by the external layers or epidermis. Toward that end, electrical weed killing apparatus have been utilized with cutter implements so that the current may be conducted to the plants by the cutter blades after the plants are cut. The use of electrical weed killing means in association with cutter blades is disclosed, for example, in U.S. Pat. Nos. 593,235 and 728,312 aforementioned.

Abrading the surface of plants in preparation for growth control treatment is also well known as disclosed in U.S. Pat. No. 2,988,849 to Laughlin. According to the disclosure in the Laughlin patent, the external surfaces of plant leaves are abraded in order to remove coatings in preparation for injection or feeding of growth chemicals into the plant.

The extermination of weeds and other undesirable vegetation by electrical energy has heretofore required the supply of large electrical voltages for plant destruction purposes. While lower power consumption of electrical energy may be required in connection with the use of cutter implements, the power consumed by the operation of the cutter device cancels any power savings effected. Further, cutting of vegetation in connection with any weed killing operation may be undesirable. Although abrading of leaf surfaces is known, as disclosed in the Laughlin patent aforementioned, the abrading of plant stems or stalks to the extent necessary for removal of a high electrically resistant external layer, in order to expose lower electrically resistant plant tissues, in combination with prolonged electrode contact has not been taught by the prior art in connection with electrical weed killing operations despite the tremendous amount of invention activity that has characterized agricultural technology for many years. It is, therefore, an important object of the present invention to provide a more effective electrical weed killing operation achieved more economically then heretofore possible from an energy consumption standpoint.

SUMMARY OF THE INVENTION

In accordance with the present invention, weed killing apparatus is conveyed along a predetermined path in trailing relationship to a tractor vehicle to which it is hitched. A source of electrical energy such as a generator driven by a power take-off from the tractor vehicle is mounted on a platform carried by the hydraulically powered, three point hitch assembly generally associated with agricultural tractor vehicles. An electrode abrading device is mounted in rearwardly suspended relation to the platform for engagement with the stems or stalks of undesirable vegetation along the path of movement of the tractor vehicle. The abrading device which may be in the form of one or more rotor mounted blades or fixed blades is effective to remove portions of the external plant layer such sas the epidermal cells and cuticle containing a wax-like elector-resistance substance. More electrically conductive cell tissues of the plant stems or stalks are thereby exposed for direct and prolonged contact by electrodes to which electrical energy is conducted from the generator. A relatively low voltage may thereby be applied to the electrodes in order to conduct current through the electrically conductive tissues of the plants or vascular bundles within the denuded plant stems or stalks. The vascular bundles or tissues of the weeds or plants are thereby rendered functionless by a relatively low electrical current.

These together with other objects and advantages which will become subsequently apparent residue in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG, 1 is a side elevational view of weed killing apparatus constructed in accordance with the present invention in a typical installation.

DETAILED DESCRIPTION OF THE INVENTION

Figure 1:
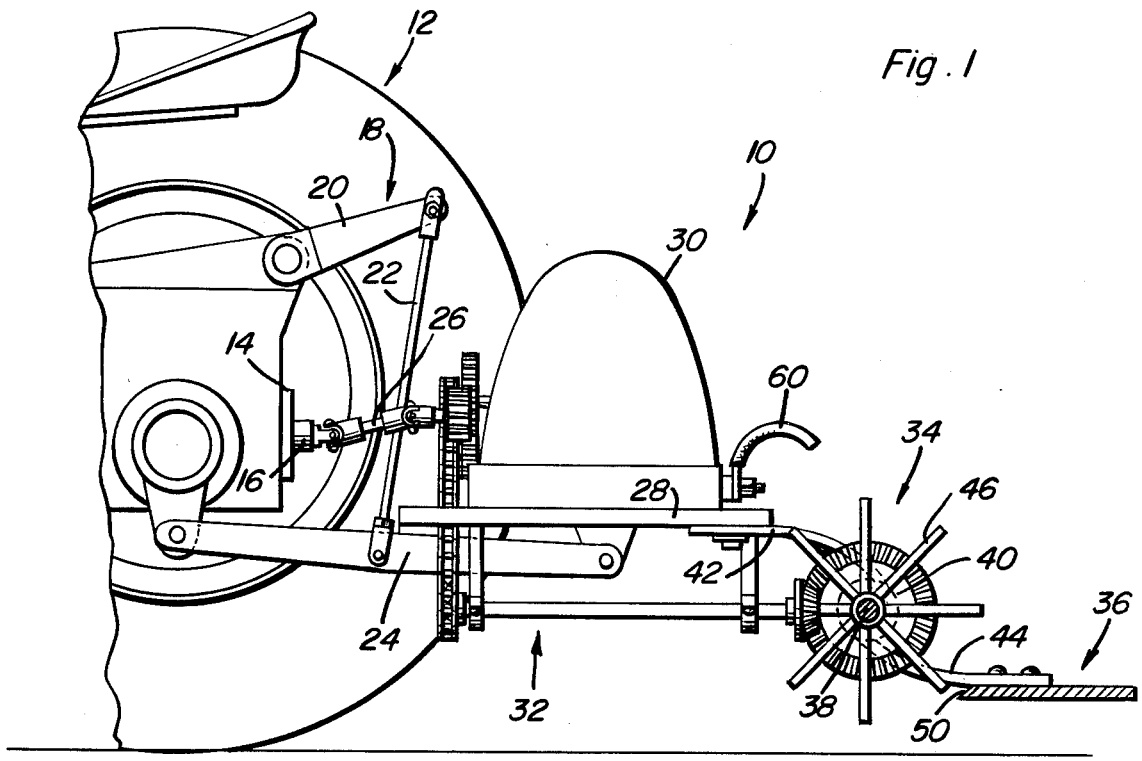
Figure 2:
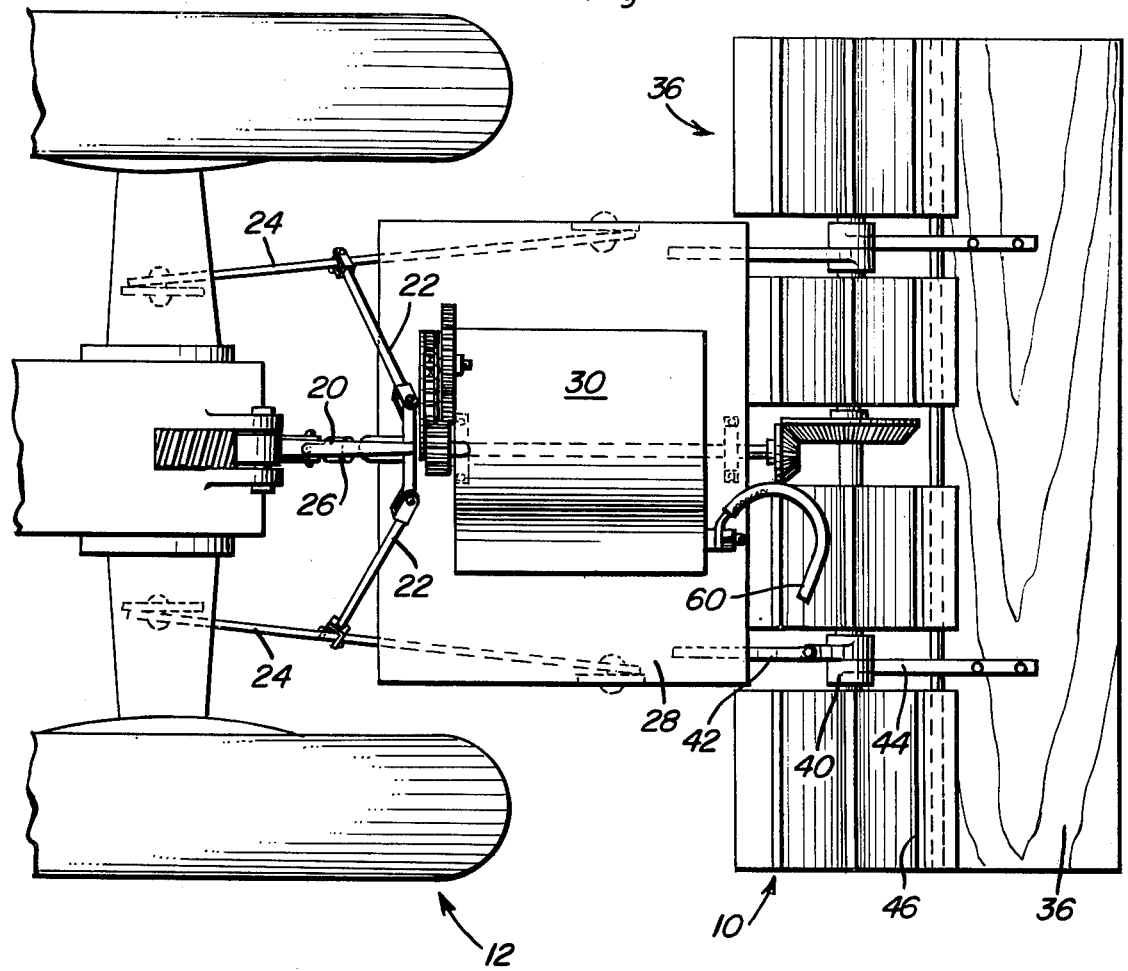
FIG. 2 is a top plan view of the installation shown in FIG. 1.
Figure 3:
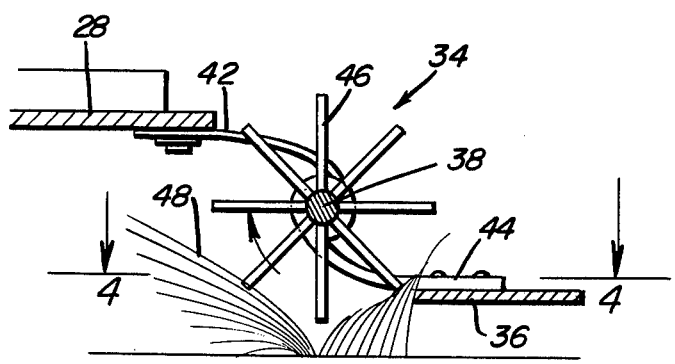
FIG. 3 is a side sectional view taken substantially through a plane indicated by section line III—III in FIG. 1.

Referring now to the drawings in detail, FIGS. 1, 2 and 3 illustrate a typical installation for the weed killing apparatus of the present invention which is generally denoted by reference numeral 10. The weed killing apparatus is connected to and mounted in trailing relation to a conventional tractor vehicle generally referred to by reference numeral 12. The tractor vehicle includes the usual power take-off gear box 14 from wjich a power take-off shaft 16 extends rearwardly. Also associated with the tractor vehicle is the usual three point hitch assembly generally referred to by reference numeral 18. The hitch assembly includes the usual power operated arm 20 connected by links 22 to a pair of lift arms 24. The lift arms 24 support the weed killing apparatus 10 which is furthermore powered by the power take-off shaft 16 through a universal shaft coupling 26 that is made of non-conductive material.

The weed killing apparatus includes a platform 28 that is pivotally connected to the lift arms 24 of the hitch assembly 18 for adjustable vertical positioning. An electrical generator 30 is mounted on the platform and is driven by the power take-off shaft 16 through the universal shaft coupling 26. Also drivingly connected to the universal shaft coupling through drive assembly 32 is a rotating type of electrode abrading device generally referred to by reference numeral 34. The abrading device 34 is suspended from the platform 28 in spaced trailing relationship thereto. Also suspended from the platform is spaced trailing relationship to the abrading device 34 is a fixed, abrasive electrode member generally referred to by reference numeral 36.

The abrading device 34 in the embodiment illustrated in FIGS. 1, 2 and 3, includes a lateraly elongated rotor shaft 38 rotatably mounted by a pair of laterally spaced bearing assemblies 40 that are suspended from the platform by non-conductive strap members 42. The rotor shaft 38 is thereby mounted for rotation about a horizontal axis perpendicular to the direction of travek of the tractor vehicle. Further, the suspension straps 42 electrically isolate the abrading device from the platform 28 on which the electrical generator 30 is mounted. Non-conductive mounting straps 44 also extend rearwardly and downwardly from the bearings 40 and mount the electrode member 36 which also extends laterally in parallel spaced relationship to the rotor shaft 38. A plurality of radially extending blades 46 are connected to the rotor shaft and are arranged to engage the weeds of the stems or stalks 48 of vegetation as the tractor vehicle moves forwardly along a predetermined path of movement as shown in FIG. 3. The abrading blades 46 are rotated in a clockwise direction for this purpose as shown.

Figure 4:
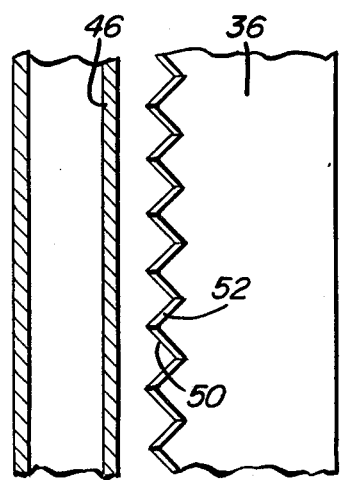
FIG. 4 is an enlarged partial sectional view taken substantially through a plane indicated by section line IV—IV in FIG. 3.

The rearwardly facing side portions of the plant stems or stalks 48 abraded by the blades 46 are subsequently engaged by the forward, serrated edge 50 of the electrode member 36 as more clearly seen in FIGS. 3 and 4. The contact edge 50 of the electrode member may also be provided with a bevel surface 52 as shown.

Figure 7:
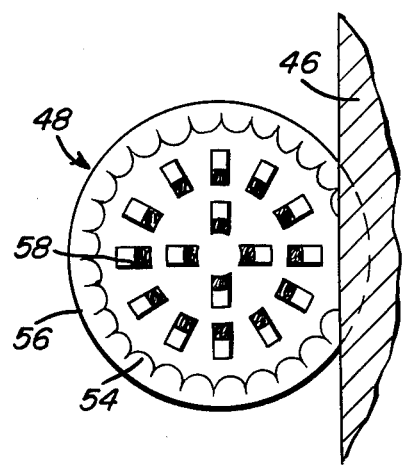
FIG. 7 is an enlarged partial top sectional view showing the abrading action on the stem of a plant in accordance with the present invention.
Figure 8:
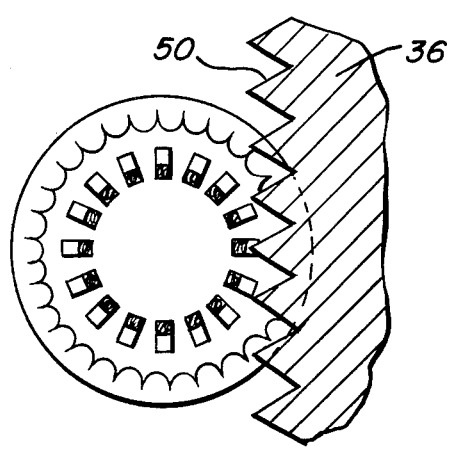
FIG. 8 is an enlarged top sectional view showing electrode contact with the stem of a plant following abrasion in accordance with the present invention.

FIG. 7 illustrates an enlarged cross section of the stem of the weed plant 48. This type of stem includes epidermis cells 54 coated with a cuticle layer 56 which contains an electro-resistant wax-like substance. These external layers 54 and 56 protectively enclose vascular bundles 58 of electro-conductive tissues. As shown in FIG. 8, a portion of the external protective layers 54-56 are removed by the abrading blade 46 to thereby expose the vascular bundles 58. Thus, following engagement of the stem 48 by the abrading blades 46, the vascular bundles will be exposed for contact by both blades 46 and the contact edge 50 of the electrode member 36 as depicted in FIG. 8. Electrical energy conducted to the abrading device 34 and to the electrode member 36 through a conductor 60 as shown in FIGS. 1 and 2 will accordingly result in a flow of current to ground through the stem of the weed plant 48. Because of the prolonged electrode contact and removal of the high electrical resistant layers, the voltage necessary to produce a sufficiently high weed killing current is reduced.

Figure 5:
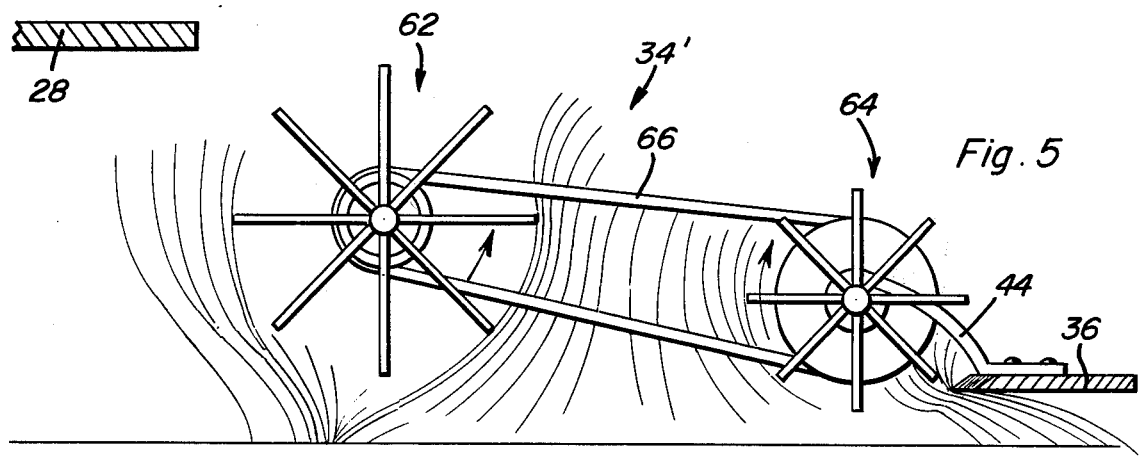
FIG. 5 is a side sectional view showing another modification.
Figure 5:
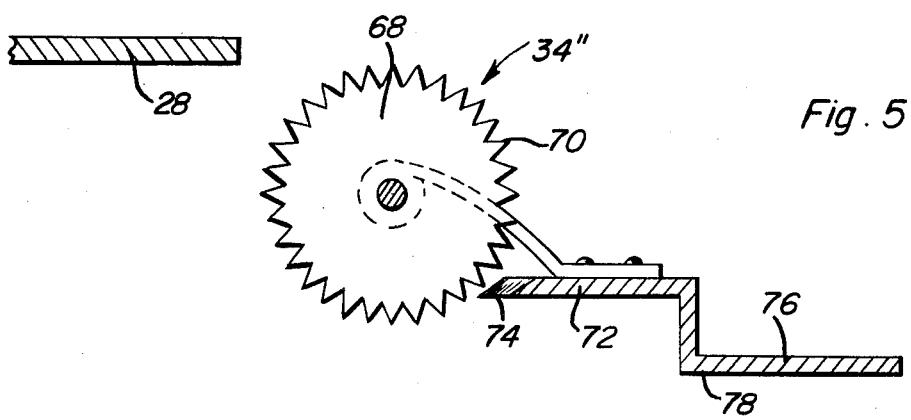

FIG. 5 shows yet another modification of the arrangement illustrated in FIGS. 1-3 in which the abrading device 34" mounted is rearward trailing relation to platform 28, is in the form of a rotor drum 68, having radially projecting teeth 70 for engagement with the stem of the weeds. An electrode member 72 similar to the electrode member 36 heretofore described, is fixedly mounted in trailing relation to the toothed rotor drum 68 for contact with the exposed tissues of the abraded weed stems at the contact edge 74. An additional electrode plate member 76 is fixedly mounted in rearward relation to the electrode member 74 and spaced therebelow for subsequent contact with the weed stems along a flat horizontal surface 78. The second electrode plate member 76 insures that all weeds are destroyed along its path movement.

Figure 6:
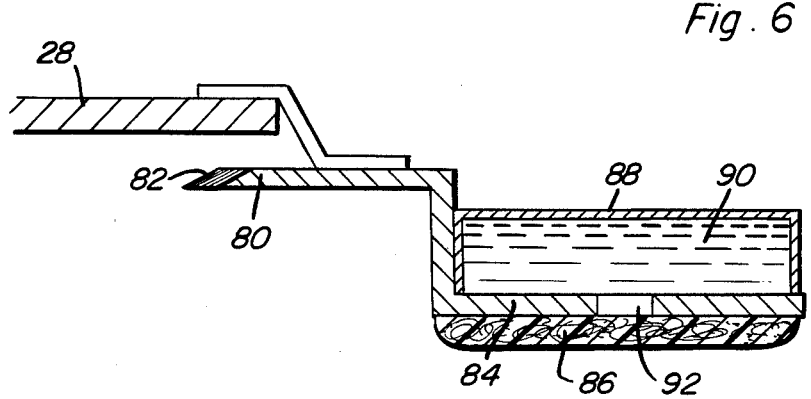
FIG. 6 is a side sectional view of yet another modification.

FIG 6. illustrates another embodiment in which a fixed abrading electrode member 80 is mounted in trailing relation below the generator carrying platform 28. Current is conducted from the output of the generator to the member 80 which also acts as the abrading device. The forward edge 82 of the member 80 thus engages the stem of the weeds for removal of the electro-resistant layers, as well as to conduct current thereto. A second electrode plate member 84 is connected to the plate member 80 and extends horizontally therefrom in spaced trailing relation for subsequent engagement with abraded weeds. The plate member 84 mounts an absorbent pad 86 therebelow for contact with the abraded stems of the weeds. A liquid reservoir 88 is carried on top of the plate member 84 containing a liquid electrolyte 90. Passages 92 in the plate member 84 provide for restricted fluid communication between the liquid reservoir and the absorbent pad to maintain it filled with electrolyte so that electric current is more readily connected to exposed electrically conductive tissues of the abraded stems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for killing undesirable vegetation having stems projecting upwardly from the ground, comprising a mobile frame adapted to be move along the ground, abrading means mounted on the frame for engagement with the stems of said vegetation to remove external layers therefrom, electrode means mounted on the frame for prolonged sequential contact with exposed internal tissues of the vegetation abraded by said abrading means, and electrical supply means connected to the electrode means for conducting current through the abraded vegetation in contact with the electrode means, said abrading means including a rotor, a plurality of blades projecting radially from the rotor and drive means for imparting rotation to the rotor during movement of the frame in a forward direction.

2. The combination of claim 1 wherein said electrode means includes a conductive plate member fixedly mounted by the frame in trailing relation to the rotor, said plate member having a forward contact edge engageable with the exposed internal tissues of the vegetation.

3. The combination of claim 2 wherein said contact edge is serrated.

4. The combination of claim 2, wherein said electrode means further includes a second plate member mounted in parallel spaced, trailing relation below the first mentioned plate member.

5. Apparatus for killing undesirable vegetation having stems projecting upwardly from the ground, comprising a mobile frame adapted to be moved along the ground, abrading means mounted on the frame for engagement with the stems of said vegetation to removal external layers therefrom, electrode means mounted on the frame for prolonged sequential contact with exposed internal tissues of the vegetation abraded by said abrading means, and electrical supply means connected to the electrode means for conducting current through the abraded vegetation in contact with the electrode means, said abrading means including a conductive plate member fixedly mounted by the frame, said plate member having a forward contact edge engageable with the stems to expose the internal tissue of the vegetation, an absorbent contact pad mounted on the plate member, a reservoir of liquid electrolyte mounted on the plate member and passage means for conducting the electrolyte from the reservoir to the pad.

* * * * *